United States Patent
Ranno

[15] 3,685,464
[45] Aug. 22, 1972

[54] PALLET
[72] Inventor: Albert J. Ranno, 8228 Southern Blvd., Youngstown, Ohio 44512
[22] Filed: Sept. 18, 1972
[21] Appl. No.: 73,451

[52] U.S. Cl. .................................. 108/58, 108/51
[51] Int. Cl. ............................................ B65d 19/18
[58] Field of Search ........................... 108/51–58

[56] References Cited

UNITED STATES PATENTS

| | | | |
|---|---|---|---|
| 3,561,375 | 2/1971 | Hammond | 108/53 |
| 2,446,914 | 8/1948 | Fallert, et al. | 108/57 |
| 3,469,542 | 9/1969 | Ahlenius | 108/56 |
| 2,584,762 | 2/1952 | Vossenberg | 108/57 |
| 3,118,400 | 1/1964 | Kempt, Jr. et al. | 108/58 |
| 3,187,689 | 6/1965 | Hess | 108/58 |
| 3,481,285 | 12/1969 | Vellin | 108/58 |
| 3,511,191 | 5/1970 | Barry, Jr., et al. | 108/58 |

*Primary Examiner*—Bobby R. Gay
*Assistant Examiner*—Glenn O. Finch
*Attorney*—Brown, Murray, Flick & Peckham

[57] ABSTRACT

A four-way pallet formed in one piece from structural foam plastic material and having features which accommodate rapid molding of the pallet. The pallet is formed in an injection molding process wherein the stringers separating upper and lower decks of the pallet are formed with openings therein which reduce the effective cross-sectional area of the stringers and thus speed up the curing and cooling of the pallet within a mold.

4 Claims, 4 Drawing Figures

INVENTOR.
ALBERT RANNO

PALLET

BACKGROUND OF THE INVENTION

As is known, the usual four-way pallet consists of an upper and a lower deck separated by spaced, parallel stringers. The upper and lower decks are formed from wooden boards; while the stringers are ordinarily formed from wooden two-by-fours or the like. Aligned notches are formed in the bottoms of the stringers to accommodate the forks of a fork lift truck from two of the opposite sides of the pallet; while the other two opposite sides of the pallet receive the forks of a fork lift truck between the aforesaid stringers. Thus, the pallet is called a "four-way pallet" for the reason that it can be picked up by a fork lift truck from any one of its four sides.

Since pallets of this type are normally formed from wood and are nailed or stapled together, they are relatively heavy, sometimes come apart at the nailed joints, and are subject to deterioration because of moisture or other causes. Furthermore, since the pallets are formed from a number of wooden pieces, considerable labor is involved in assembling these pieces and nailing them together, even though a nailing machine might be used.

SUMMARY OF THE INVENTION

In accordance with the present invention, a four-way pallet is provided formed in one piece from structural foam plastic material. Such structural foam plastic material may be comprised of various chemical compositions, but in all cases the interior of the foam has a cellular structure as is produced, for example, by nitrogen bubbles; while the outer surface of the plastic is contiguous and forms a skin for the inner cellular structure.

The pallet comprises upper and lower decks separated by and integrally formed with at least three spaced, parallel stringers providing spaces therebetween for the reception of the spaced forks of a fork lift truck. Two of the stringers are at the opposite sides of the pallet; while at least a third stringer is intermediate the two stringers. The side walls of the pallet at the ends of the stringers have openings therein to receive the spaced forks of a fork lift truck from two opposite sides of the pallet. Aligned notches are formed in the bottoms of the stringers for receiving forks from the other two opposite sides. In order to accommodate fork lift trucks wherein wheels are mounted on the bottoms of the forks themselves, openings are formed in the lower deck, the openings extending between the other two opposite sides of the pallet but having a length less than the width of the pallet and positioned beneath the notches in the aforesaid stringers.

Further, in accordance with the invention, the stringers, which are relatively thick in comparison to the thickness of the upper and lower decks, are provided with holes or openings which extend through the lower deck and into the stringers at spaced points along their lengths. In this manner, the holes reduce the wall thickness of the stringers at any point and, hence, speed up the curing and drying of the plastic material within a mold. In this respect, it has been found that a pallet of this type may be molded by injection molding techniques in seven minutes less time than would be required for the case where the stringers are solid along their entire lengths. Furthermore, the use of openings in the stringers in the manner described above reduces the amount of plastic material required for the fabrication of the pallet, without materially reducing its strength.

The above and other objects and features of the invention will become apparent from the following detailed description taken in connection with the accompanying drawings which form a part of this specification, and in which.

Figure 1:
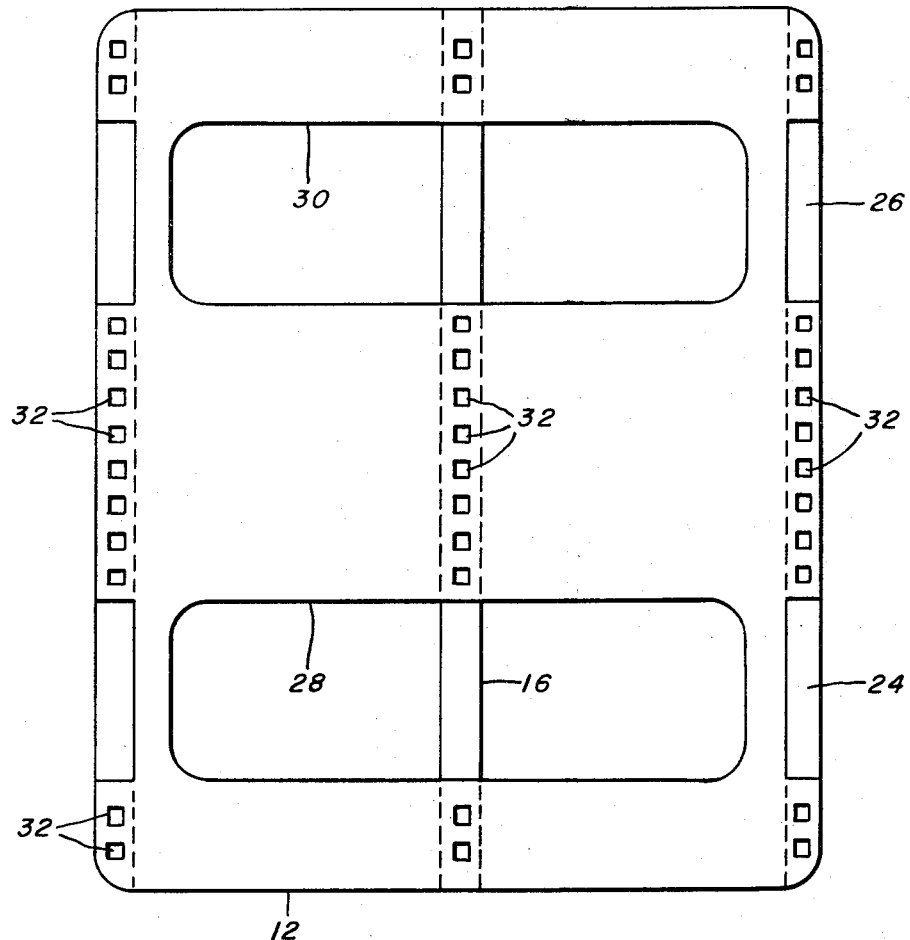
FIG. 1 is a bottom view of the pallet of the invention.
Figure 2:
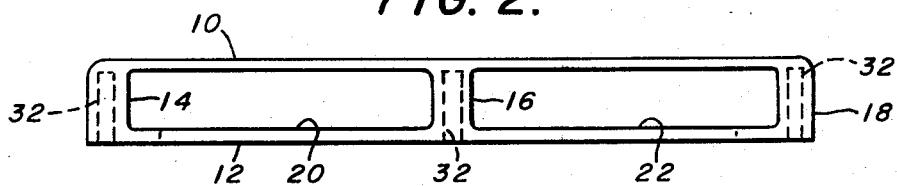
FIG. 2 is an elevational end view of the pallet shown in FIG. 1.

With reference now to the drawings, and particularly to FIGS. 1 and 2, the pallet shown includes an upper deck 10 and a lower deck 12 separated by three spaced stringers 14, 16 and 18. The stringers 14 and 18 are at the sides of the pallet; while the stringer 16 is intermediate the sides. Formed in the ends of the pallet, adjacent the ends of the stringers 14–18, are elongated openings 20 and 22 (FIG. 2) for the reception of the spaced forks of a fork lift truck. The two forks can enter the openings 20 and 22 on either side of the central stringer 16. When the forks are elevated, they will engage the lower surface of the upper deck 10, thereby raising the pallet and a load carried thereon.

Figure 3:
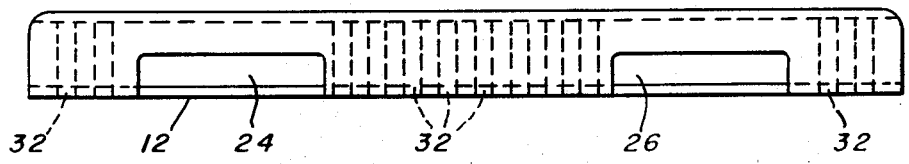
FIG. 3 is an elevational side view of the pallet shown in FIG. 1.
Figure 4:
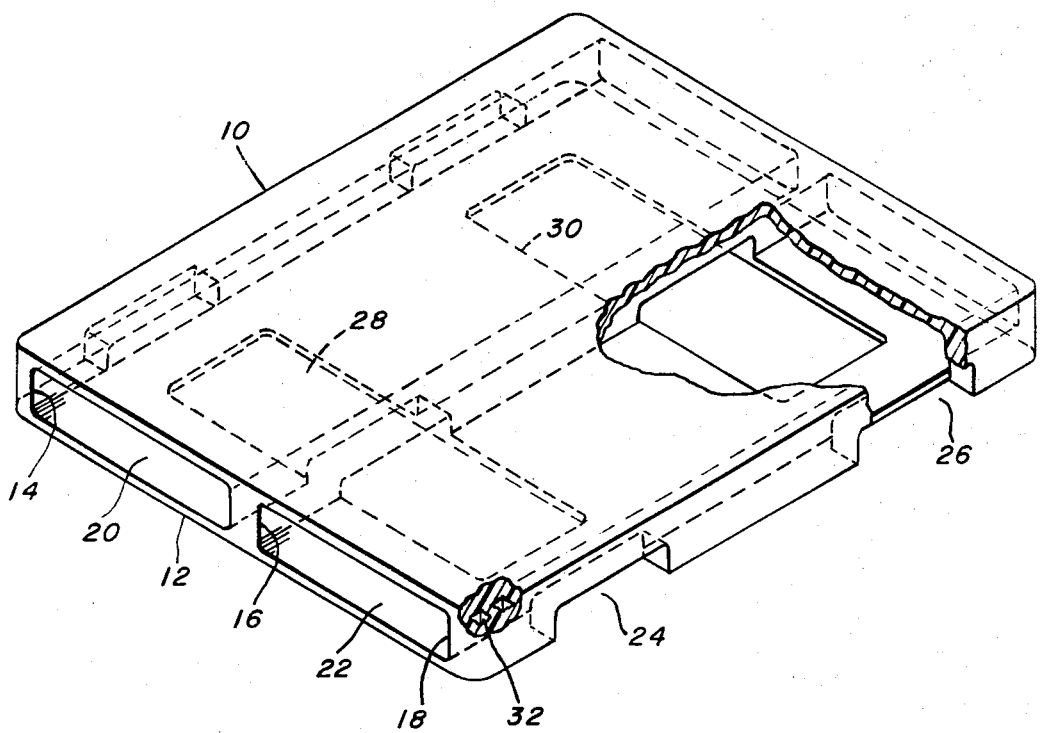
FIG. 4 is a perspective view of the pallet of the invention.

As best shown in FIGS. 3 and 4, the stringers 14–18 are each formed with spaced notches 24 and 26, the notches in the respective stringers being aligned with each other. These notches, like the openings 20 and 22, are adapted to receive the spaced forks of a fork lift truck such that when the forks are elevated, they will engage the upper surfaces of the notches 24 and 26 to raise the pallet and a load carried thereby.

The lower deck 12, as best shown in FIG. 1, is provided with two elongated openings 28 and 30. These elongated openings 28 and 30 are directly beneath the notches 24 and 26 in the stringer 16; however they do not extend entirely to the edges of the pallet. The openings 28 and 30 are provided for fork lift trucks of the type wherein wheels are mounted directly on the bottoms of the forks. As the forks are inserted through the openings 20 and 22, for example, the wheels will roll over portions of the bottom deck until they reach the openings 28 and 30, whereupon the wheels are lowered, thereby forcing the forks upwardly to elevate the pallet. Similarly, if forks with wheels enter the notches 24 and 26, they will pass over portions of the lower deck 12 until they are positioned within the openings 28 and 30; whereupon the forks can be elevated with the wheels remaining on the ground.

Provided in each of the stringers 14–18 is a plurality of aligned holes 32 which extend into the stringers through the bottom deck 12 but which terminate before they reach the top deck 10. The pallet is formed in one piece in a plastic molding operation wherein structural foam plastic material is injected into a mold. The structural foam plastic material is of the type wherein the inner core of the material is cellular as is formed by injecting nitrogen bubbles into the plastic before it cures; while the surfaces of the plastic which engage the walls of the mold form a skin. If an attempt is made to mold a plastic pallet of this type with solid stringers extending throughout the length of the pallet, considerable time is required to cure and cool the stringers, meaning that the production rate of such pallets is relatively low. However, by providing the holes or openings 32 within the stringers, the wall thickness of the stringers at any point along their length is materially reduced, speeding up the curing and cooling process, by as much as 7 minutes in a typical installation. Each of the stringers may typically be about 48 inches in length, have a width of 2 inches and a height of 4 inches. The holes 32 are preferably three-quarter inch square and 4 inches deep and spaced apart to provide about 12 holes in each stringer.

Although the invention has been shown in connection with a certain specific embodiment, it will be readily apparent to those skilled in the art that various changes in form and arrangement of parts may be made to suit requirements without departing from the spirit and scope of the invention.

I claim as my invention:

1. A four-way pallet construction formed in one piece by injection molding from structural foam plastic material and comprising upper and lower decks separated by and integrally formed with at least three spaced parallel stringers providing spaces therebetween for the reception of the spaced forks of a fork lift truck, two of said stringers being at two opposite edges of the pallet and at least a third of said stringers being intermediate said two stringers, the end side walls of said pallet at the ends of said stringers having openings therein to receive said spaced forks from two opposite sides of said pallet, aligned notches formed in the bottoms of said stringers for receiving from the other two opposite sides of said pallet the spaced forks of a fork lift truck, and a pair of spaced openings formed in said lower deck, said openings extending between said other two opposite sides of the pallet but having lengths less than the width of the pallet and being positioned beneath the notches in said third of said stringers.

2. The pallet construction of claim 1 wherein said structural foam plastic has a cellular core and a smooth outer surface.

3. The pallet construction of claim 2 wherein said stringers have cavities spaced therealong and extending into the stringers from the lower deck of the pallet.

4. The pallet construction of claim 3 wherein said openings in the lower deck extend transversely of the stringers.

* * * * *